(12) United States Patent
Jeon

(10) Patent No.: US 8,172,210 B2
(45) Date of Patent: May 8, 2012

(54) HOLDING UNIT FOR PANEL TRANSMITTING DEVICE

(75) Inventor: Ho Jeon, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 564 days.

(21) Appl. No.: 12/364,603

(22) Filed: Feb. 3, 2009

(65) Prior Publication Data
US 2010/0133405 A1 Jun. 3, 2010

(30) Foreign Application Priority Data
Dec. 3, 2008 (KR) .................. 10-2008-0121883

(51) Int. Cl.
*B25B 11/00* (2006.01)
*B25B 1/22* (2006.01)
*B23Q 1/25* (2006.01)
*B23Q 3/00* (2006.01)

(52) U.S. Cl. ............. 269/21; 269/71; 269/75; 269/55; 269/289 R

(58) Field of Classification Search .......... 269/21, 269/71, 75, 55, 289 R; 248/316.1; 901/30
See application file for complete search history.

(56) References Cited

U.S. PATENT DOCUMENTS

| | | | | |
|---|---|---|---|---|
| 4,183,511 | A * | 1/1980 | Marek | 269/71 |
| 4,674,949 | A * | 6/1987 | Kroczynski | 414/749.1 |
| 5,507,470 | A * | 4/1996 | Amstutz | 254/10.5 |
| 6,312,210 | B1 * | 11/2001 | Lang | 414/540 |
| 7,008,165 | B1 * | 3/2006 | Grimes | 414/589 |
| 7,243,904 | B1 * | 7/2007 | Grimes | 254/2 B |
| 7,448,606 | B1 * | 11/2008 | Johnson | 269/17 |
| 7,784,802 | B2 * | 8/2010 | White | 280/79.11 |
| 2003/0160144 | A1 * | 8/2003 | Guadagnini | 248/447 |
| 2009/0010746 | A1 * | 1/2009 | Okazaki | 414/590 |

* cited by examiner

*Primary Examiner* — Monica Carter
*Assistant Examiner* — Seahee Yoon
(74) *Attorney, Agent, or Firm* — Edwards Wildman Palmer LLP; Peter F. Corless

(57) ABSTRACT

A holding unit for a panel transmitting device provided with a robot of an articulated joint type to hold a panel of various types and transmit between processes includes a supporting means and a plurality of moving means. An end of the supporting means is movably supported and fixed to the robot and the other end of which extends along a width direction of the panel. Each of the moving means is provided with a moving bar an end of which is provided at a side of the supporting means and is able to rotate and slide in a thickness direction and a width direction of the panel so that the other end thereof may hold the panel. With the unit, precise position adjustment can be achieved in a cost-effective manner.

6 Claims, 2 Drawing Sheets

HOLDING UNIT FOR PANEL TRANSMITTING DEVICE

CROSS-REFERENCE TO RELATED APPLICATION

This application claims priority to and the benefit of Korean Patent Application No. 10-2008-0121883 filed on Dec. 3, 2008, the entire contents of which are incorporated herein by reference.

BACKGROUND (a) Technical Field

The present invention relates to a holding unit for a panel transmitting device, and more particularly, to a holding unit for a panel transmitting device which has an enhanced compatibility and user's convenience.

(b) Description of the Related Art

In a vehicle manufacturing process, a panel transmitting device is provided for holding and transmitting a panel between sub-processes.

Typically, the panel transmitting device includes a robot, a supporting means, and a moving means. The robot may be realized in a well-known multiple articulated joint type, and a quick change adapter (QCA) is provided at an end thereof. The supporting means is coupled to one side of the adapter and is formed in a bar shape supporting load of the panel. The moving means is formed such that an end thereof is supported at both sides of the supporting means and the other end thereof is able to respectively hold the panel.

However, the conventional panel transmitting device has a problem that to replace the panel transmitted between sub-processes, a worker must manually replace the moving means according to the shape of the panel, which results in decreased preciseness and increased time for replacement, thereby lowering working capacity and overall productivity. In addition, many moving means corresponding to various shapes of panel types are needed, which causes manufacturing cost to be increased.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a holding unit for a panel transmitting device which can hold various panels with different shapes.

An exemplary embodiment of the present invention provides a holding unit for a panel transmitting device provided with a robot which can stably hold and transmit a panel regardless of the shape of the panel. The holding unit may include a supporting means an end of which is movably supported and fixed to the robot and the other end of which extends along a width direction of the panel; and a plurality of moving means each provided with a moving bar an end of which is provided at a side of the supporting means and is able to rotate and slide in a thickness direction and a width direction of the panel so that the other end thereof may hold the panel.

Preferably, the supporting means may further comprise a plurality of plates which are separated from each other and a plurality of guide bars each of which is supported and connected to two of the surfaces of the plates and is provided with a slider reciprocally movable on and along a circumferential surface of the guide bar.

Suitably, the slider is configured to be able to stop at one or more predetermined positions on the circumferential surface of the guide bar.

Suitably, an end of the moving bar of the moving means may be fixedly connected to the slider and the other end of the moving bar may be provided with an absorbing plate for holding the panel.

Suitably, the moving bar of the moving means may be formed by a plurality of sections such that one end of a section can be inserted into and exited from an inside of another section thereby allowing the moving bar to be expandable and contractable.

Suitably, the moving means may further comprise a clamp provided at a position between the end of the moving bar at the side of the supporting means and the other end thereof so as to adjust the position the other end.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 1:
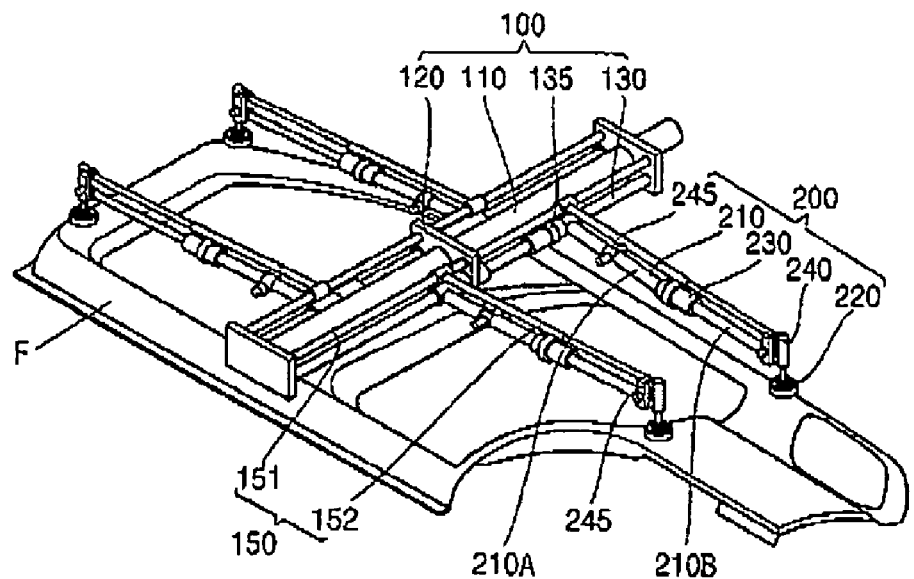
FIG. 1 is a perspective view of a holding unit for a panel transmitting device according to an embodiment of the present invention.

Reference numerals set forth in the Drawings includes reference to the following elements as further discussed below:

| | |
|---|---|
| 100: supporting means | 110: supporting bar |
| 120: plate | 130: guide bar |
| 135: slider | 200: moving means |
| 210: moving bar | 220: absorbing plate |
| 230: clamp | 240: connector |
| 245: holder | F: panel |

DETAILED DESCRIPTION

Exemplary embodiments of the present invention will hereinafter be described in detail with reference to the drawings.

Terms and words used in the specification and claims should not interpreted limitedly as general literal meanings, and should be interpreted as meanings and concepts which are complied with the spirit of the invention in conformity with the principle that the inventor can define the meaning of words in order to explain the invention in a best way.

Accordingly, an embodiment disclosed in the specification and the structure shown in the drawings are only an embodiment of the present invention, and does not cover all the spirit of the invention, so it should be understood that there are various equivalents and variations which substitute the same at the time of filing.

FIG. 1 is a perspective view of a holding unit for a panel transmitting device according to an embodiment of the present invention.

As shown in FIG. 1, the holding unit for a panel transmitting device according to an embodiment of the present invention includes a supporting means 100 and a plurality of moving means 200. A side of the supporting means 100 is coupled to a robot (not shown) provided between sub-processes for supporting the load of a panel F. An end of the moving means 200 is connected to a side of the supporting means 100 and the other end of the moving means 200 is configured to be able to hold various types of panels.

The robot can be realized by one conventionally used in the art. For example, it may be a multiple articulated joint type robot, detailed description of which will be omitted. An adapter and a gripper are provided at an end of the robot. The adapter is configured to be able to be attached and detached to a side of the supporting means 100. The gripper is configured to be able to be attached and detached to the adapter and perform gripping function by pneumatic pressure.

An end of the supporting means 100 is movably supported and fixed to the adapter of the robot, and the other end thereof is provided with a supporting bar 110 which extends in a width Y direction of the panel F.

As shown in FIG. 1, the supporting means 100 includes a plurality of plates 120, a plurality of the supporting bars 110 and a plurality of guide bars 130. The plates 120 are separated from each other and fixed to the supporting bars 110 and the guide bars 130. Both ends of the guide bar 130 are supported and connected to plate surfaces of the plates 120. At least one of the guide bars 130 may be provided with a slider 135 which is reciprocally movable on circumferential surfaces thereof. The slider 135 is pneumatically controlled so as to be able to stop at a desired position on the circumferential surface of the guide bar 130. Accordingly, the moving means 200 can reciprocally move or stop.

Each of the moving means 200 may include a moving bar 210, an absorbing plate 220 and a clamp 230. An end of the moving bar 210 is fixedly connected to the slider 135 so as to be able to rotate and slide in a thickness Z direction and in a width Y direction of the panel F. The absorbing plate 220 is provided at the other end of the moving bar 210 for holding the panel F. The clamp 230 is fixed at a position between the two ends of the moving bar 210.

The moving bar 210 may be formed by a plurality of sections 210A, 210B such that one end of a section can be inserted into and exited from an inside of another section thereby allowing the moving bar to be expandable and contractable.

Preferably, the moving bars 210 may be provided at both sides of the supporting means 100 so as to stably hold and transmit the panel F. As a non-limiting example, as shown in FIG. 1, two moving bars 210 may be provided at each side of the supporting means 100. As another non-limiting example, two moving bars 210 may be provided at one side of the supporting means 100 and one moving bar 210 may be provided at the other side of the supporting means 100.

The absorbing plate 220 is configured to hold the panel F using vacuum during contact with the panel F and to transmit the panel between sub-processes by the robot.

The clamp 230 can be provided at a position between the end of the moving bar at the side of the supporting means and the other end thereof so as to adjust the position the other end.

In an embodiment, the holding unit may further include one or more auxiliary supporting means 150 to further firmly support the moving means 200. Each of the auxiliary supporting means 150 includes an auxiliary guide bar 151 and an auxiliary moving bar 152. The auxiliary guide bar 151 is disposed near and in parallel with the guide bar 130 and both ends thereof are supported to the surfaces of the plates. The auxiliary moving bar 152 is movable along an outer surface of the auxiliary guide bar 151 and is expandable and contractable along its longitudinal direction.

Reference numeral 240 indicates a connector which not only connects the moving bar 210 and the auxiliary moving bar 152 together but also arranges the absorbing plate 220 toward a surface of the panel F. Reference numeral 245 indicates a holder which is protruded toward one side of the connector 240 and one side of the moving bar 210 and is coupled to the gripper of the robot to move the moving means 200 in a length X direction, a width Y direction, and a thickness Z direction of the panel F.

Operations of the holding unit for a panel transmitting device will be explained with reference to FIGS. 2-4 hereinafter.

Figure 2:
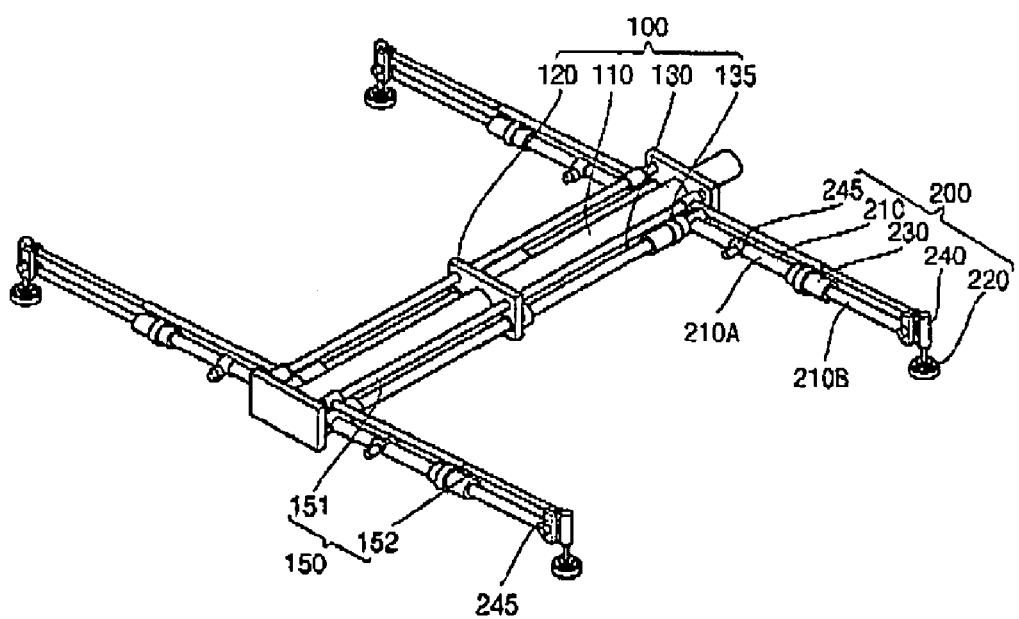
FIG. 2 is a perspective view of the holding unit of FIG. 1 showing a state before the holding unit operates.

Referring to FIG. 2, in a holding unit for a panel transmitting device according to an embodiment of the present invention, in case that a type of the panel F which is transmitted between sub-processes is replaced, an end of the supporting bar 110 is restricted by an adapter of a robot on a jig (not shown) which is provided at a stand-by space between spaces and is transmitted. At this time, the moving means 200 is firmly supported to the supporting means 100 by pneumatic pressure acting on the slider 135 and the clamp 230.

Figure 3:
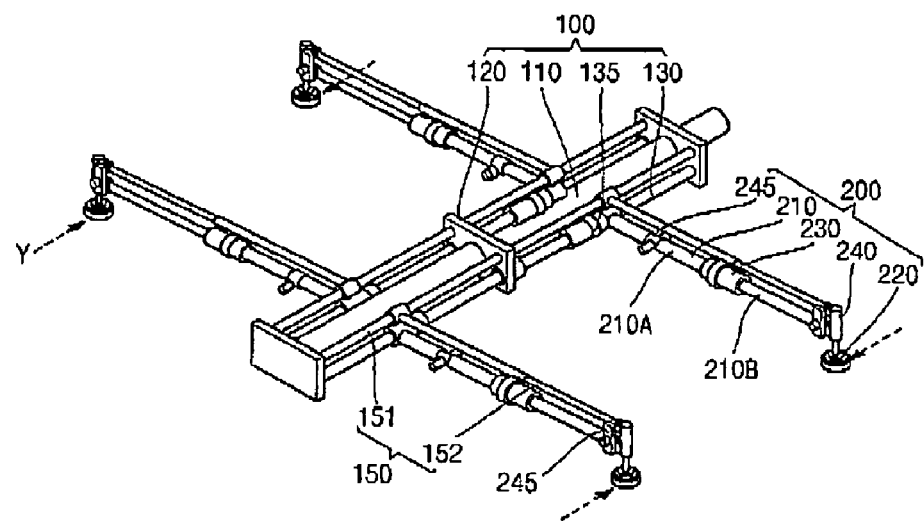
FIG. 3 is a perspective view of the holding unit of FIG. 1 showing a state in which a moving bar of the holding unit moves in a width Y direction of a panel.

In this state, as shown in FIG. 3, the gripper is connected to the adapter of the robot, and in a state that the holder 245 provided at one side of the respective moving bars 210 is restricted by the gripper, the moving bar 210 and the auxiliary moving bar 152 are suitably moved along a width Y direction of the panel which has been stored. At this time, pneumatic pressure still acts on the clamp 230, and pneumatic pressure is released from the slider 135, so the moving bar 210 can freely slide.

Figure 4:
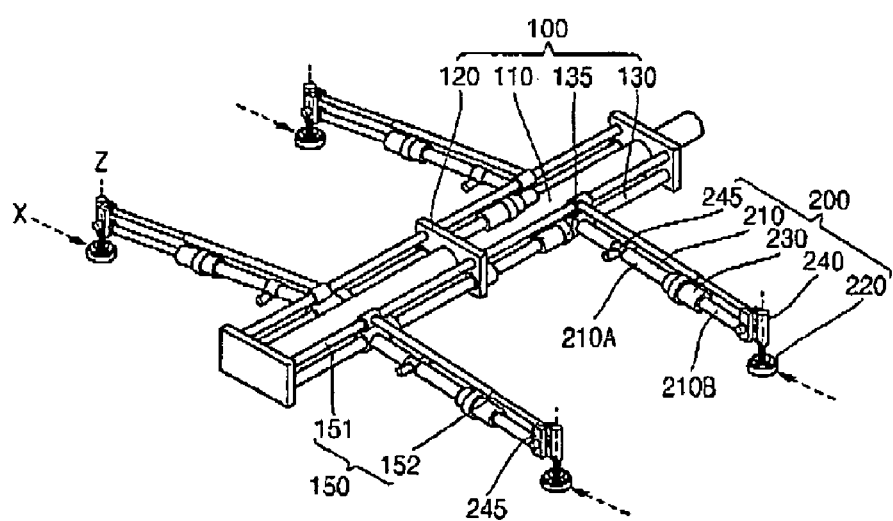
FIG. 4 is a perspective view of the holding unit of FIG. 1 showing a state in which a moving bar of the holding unit in a length Y direction and a thickness Z direction of a panel.

Next, referring to FIG. 4, the robot makes the gripper to release the tightening of the holder 245 provided at a side of the moving bar 210 and tightens the holder 245 provided to the connector 240 of the moving means 200, and suitably moves the other side of the moving bar 210 and the auxiliary moving bar 152 in a stored length X direction and a stored thickness Z direction of the panel, respectively, so the absorbing plate 220 is adjusted in accordance with the shape of the replaced type of the panel F.

At this time, pneumatic pressure acts on the slider 135 to make the moving means 200 not move in a width direction of the panel F, and pneumatic pressure is released from the clamp 230, so the moving bar 210 and the auxiliary moving bar 152 can freely rotate, expand, and contract.

If the adjustment of the absorbing plate 220 is completed as such, the gripper is separated from the adapter of the robot, and the moving means 200 is supported not to move on the supporting means 100 by acting pneumatic pressure to the slider 135 and the clamp 230, and one end of the supporting means 100 is restricted by the adapter of the robot, so the replaced panel can be transmitted between sub-processes.

According to holding units for a panel transmitting device according to the present invention, even when a panel which is transmitted between sub-processes is replaced, the moving means is precisely adjusted by automation of the robot according to the shape of the panel, so replacement can be performed in a short time and productivity can be enhanced. Furthermore, the moving means can conform with various shapes of panels, so manufacturing cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A holding unit for a panel transmitting device provided with a robot of an articulated joint type to hold a panel of various types and transmit between processes, the holding unit comprising:

a supporting means comprising an end being movably supported and fixed to the robot and the other end being extended along a width direction of the panel, the supporting means comprising a plurality of plates separated from each other and a plurality of guide bars, each of the guide bars being supported and connected to two of the surfaces of the plates and being provided with a slider reciprocally movable on and along, a circumferential surface of the guide bar;

a plurality of moving means, each of which being provided with a moving bar an end of the moving bar being provided at a side of the supporting means to allow the moving bar to be rotated and slide in a thickness direction and a width direction of the panel so that the other end the moving bar may hold the panel; and an auxiliary supporting means for supporting the moving means, the auxiliary supporting means comprising an auxiliary guide bar and an auxiliary moving bar moved along an outer surface of the auxiliary guide bar; and wherein the auxiliary guide bar is disposed parallel with the guide bar and supported to both plate surface of the plate, and the auxiliary moving bar can be reciprocally moved along an outer surface of the auxiliary guide bar and expanded and contacted along its longitudinal direction.

2. The holding unit of claim 1, wherein the slider is able to stop at one or more predetermined positions on the circumferential surface of the guide bar.

3. The holding unit of claim 1, wherein an end of the moving bar of the moving means is fixedly connected to the slider and the other end of the moving bar is provided with an absorbing plate for holding the panel.

4. The holding unit of claim 1, wherein the moving bar of the moving means is formed by a plurality of sections such that one end of a section can be inserted into and exited from an inside of another section thereby allowing the moving bar to be expandable and contractable.

5. The holding unit of claim 1, wherein the moving means further comprises a clamp provided at a position between the end of the moving bar at the side of the supporting means and the other end thereof so as to adjust the position of the other end.

6. The holding unit of claim 1, wherein the auxiliary guide bar and the moving bar are connected to each other through a connector.

* * * * *